(12) United States Patent
Malik

(10) Patent No.: US 6,453,031 B2
(45) Date of Patent: *Sep. 17, 2002

(54) METHOD AND SYSTEM FOR BILLING REMOTE CALLS IF MADE FROM A PRIMARY LINE

(75) Inventor: Dale W. Malik, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/918,672

(22) Filed: Jul. 31, 2001

Related U.S. Application Data

(63) Continuation of application No. 09/139,854, filed on Aug. 25, 1998.

(51) Int. Cl.$^7$ .............................................. H04M 15/00
(52) U.S. Cl. ............................ 379/114.23; 379/114.21; 379/114.26
(58) Field of Search ........................... 379/111, 112.01, 379/114.01, 114.21, 114.22–114.27, 114.28, 114.29, 115.01–115.02, 121.01, 127.01, 127.04–127.05, 126, 230, 229, 133–134

(56) References Cited

U.S. PATENT DOCUMENTS 5,325,421 A * 6/1994 Hou et al.
5,719,926 A * 2/1998 Hill
5,771,282 A * 6/1998 Friedes
5,991,377 A * 11/1999 Malik

* cited by examiner

Primary Examiner—Duc Nguyen
(74) Attorney, Agent, or Firm—Kilpatrick Stockton LLP

(57) ABSTRACT

A method and system for billing remote calls includes the provisioning of an active terminating attempt trigger on a subscriber's primary line. To make a long-distance call from a remote location, the subscriber calls a service control node and provide a destination calling line number and the subscriber's primary line number (e.g., home telephone number). The SCN assembles the data into a string and. includes a feature access code. This string is transmitted to a switch that recognizes the feature access code and transmits a message to a service control point. The service control point also recognizes the feature access code and reassembles the message into a call structure containing the primary line number, the destination line number, and a code indicating that the message should be reassembled. This message is transmitted back to the switch which then routes the call to the primary line switch where the trigger is encountered. The primary line switch then transmits the call information up to an SCP an includes the code. The SCP detects the code and reassembles the data to instruct the switch to route the call to the destination number through the primary line number. The switch routes the call to the destination number and the primary line number is billed for the call.

14 Claims, 7 Drawing Sheets

EXCLUSIVE LIST

METHOD AND SYSTEM FOR BILLING REMOTE CALLS IF MADE FROM A PRIMARY LINE

This application is a continuation and claims the priority of the U.S. patent application Ser. No. 09/139,854 filed on Aug. 25, 1998.

BACKGROUND OF THE INVENTION

1. Field of the Invention

The present invention is directed to billing telephone calls and, more particularly, to a method and system for billing telephone calls made by a customer from a remote location as if the call were made from the customer's primary (e.g., home) telephone line.

2. Background

When a subscriber of the Public Switched Telephone Network ("PSTN") desires to make a long-distance telephone call away from his primary residence, he has several options: (1) He may dial the call directly; (2) He may use a wireless (e.g., cellular, PCS) telephone; (3) He may call the customer collect; or (4) He may use a calling card. If the subscriber dials directly, the call will be billed to the telephone line from which the call was placed. This billing situation is usually undesirable since it is unfair for the owner of the line to pay the extra costs associated with long distance telephone calls for the subscriber's benefit. Similarly, collect calls result in a person other than the subscriber (in this case, the called party) being billed for long-distance charges that they did not themselves incur. While wireless long-distance telephone calls result in the subscriber being billed, the expense of such calls usually does not justify their use. Moreover, many PSTN subscribers simply do not own or lease wireless telephones. Accordingly, the calling card has become the most popular mechanism for remote long-distance telephone calls.

A calling card is little more than a security code issued to a subscriber by a long-distance telephone company. The company issues the code on a plastic card containing the security code and a toll-free access telephone number. When the subscriber wants to make a long-distance telephone call, he dials the toll-free access number which prompts him for the telephone number and security code (which is often a variation). He then enters both numbers and the company connects the call. The long-distance telephone company bills the subscriber monthly for the long-distance calls made during the previous month.

Unfortunately, calling cards are often inconvenient for the user. Due to the large number of digits required for completing the call, it is usually impossible to remember both the toll-free number and the security code. The two numbers may include as many as twenty-four digits. To alleviate this problem, many calling card companies may append a simple four-digit code to the end of the user's telephone number. This practice, however, creates additional security concerns should the card be lost or stolen.

SUMMARY OF THE INVENTION

The present invention addresses the problems associated with long distance telephone calls made from a place other than the caller's home. In particular, the method and the system of the present invention makes remote long distance telephone calls appear as if they originated in the caller's home. A caller who makes a long distance telephone call from his office, for example, may simply call his home number and then dial the third party's number. The call is routed through his home telephone line and connected directly to the called party. This is far more convenient than the use of a calling card in certain situations.

In particular, the method and system of the present invention provisions switches with a terminating attempt ("TAT") trigger. The trigger causes a switch to pause in processing and obtain additional information from a service control point ("SCP"). When a subscriber selects this long distance billing service, the TAT trigger on the subscriber's switch is activated. The subscriber may then dial a special access number from a remote location, such as his office or cell phone. This call directly accesses a service control node ("SCN") that requests the caller's home phone number and destination phone number. When the caller provides this information, the SCN dials a feature access code and provides the caller's phone number, the destination number, and the calling party number in a message to the switch. The switch detects the feature access code and sends a message to an SCP containing the information provided by the SCN. The SCP detects the feature access code and reassembles the data to replace the calling party field with a special access code. The redirecting party field of the message is populated with the destination number and the called party number is populated with the caller's home telephone number. This message is sent back to the switch.

The switch then routes the call to the subscriber's home telephone number. The TAT trigger at the switch servicing the subscriber's home telephone number causes the switch to pause during processing and send a message to the SCP. The SCP examines the calling party field and sees the special access code. This causes the SCP to examine the redirecting party number and use it to instruct the switch on where the call should be routed.

In another embodiment of the present invention, the subscriber specifies an authorization list of telephone numbers that are authorized to use the billing service. In addition, rather than dialing the special ALDB number. The subscriber dials his home number directly and encounters the TAT trigger. The switch pauses during processing and passes the calling party number to the SCP. The SCP checks its database to determine whether the number is an authorized number. If the number is authorized, the SCP instructs the switch to a play a message requesting the destination telephone number. When the subscriber provides the destination telephone number, the switch routes the call to the number specified by the subscriber. If the number is not authorized, the SCP instructs the switch to connect the call through to the home number. In addition, the subscriber may request that the call go directly through to the home telephone number.

In another embodiment of the present invention, the subscriber may create a destination list containing numbers to which subscribers may call using the service. Each number in the destination list is linked to a number in the subscriber's authorization list. Thus, multiple parties in the same household may be routed to different numbers depending upon their calling location. As in the previous embodiment, a subscriber dials his home telephone number from an authorized number. The SCP determines that the caller has called from an authorized number and instructs the switch to play a message to the subscriber to determine whether the call should be routed to a number in the destination list or directly to the home. If the caller specifies the first option, the call is routed to the number in the destination list corresponding to the number contained in the subscriber's authorization list. The call is billed to the home number.

To prevent fraudulent use of the service, the subscriber may specify an exclusive destination list containing an exclusive list of destination numbers. The exclusive destination list may only be changed by the subscriber and may require additional security information, such as a password. The list could not be changed otherwise. When the subscriber dials the home telephone number from an authorized number, the switch recognizes this number and plays a message to the subscriber. The message asks the subscriber if he would like to be routed to a number in the exclusive destination list or routed directly through to the home. When the caller specifies that he would like to be routed to a number in the exclusive list, the call is routed and the subscriber's home number is billed.

In another embodiment of the present invention, subscribers may create a special password that allows external systems, such as computers, to have long distance charges billed to the subscriber's home. The subscriber provides the calling number of the system to the carrier and this number is stored. When the system calls the subscriber's home phone number, the switch recognizes the calling number and requests the password and destination number. The system provides this information and the system confirms the password. If the password is confirmed, the system connects the call to the destination number and the home number is billed.

The method and system of the present invention may be further automated. by providing service during certain time intervals. The subscriber specifies certain time intervals during which calls may be billed to the subscriber's home phone number. This capability may be combined with capabilities described above, such that only certain calling numbers may use the service at the specified times. Thus, this aspect of the present invention provides greater security and fraud protection.

Accordingly, it is an object of the present invention to provide a method and system for billing long distance telephone calls made from a remote location as if the calls were made from a subscriber's home line.

It is an additional object of the present invention to provide a method and system for billing long distance telephone calls that is easy to use.

It is yet another object of the present invention to provide a method and system for billing long distance telephone calls that is economical to the subscriber.

It is another object of the present invention to provide a method and system for billing long distance telephone calls that is customizable.

It is yet another object of the present invention to provide a method and system for billing long distance telephone calls that that may be customized differently for different individuals within the same household.

It is an additional object. of the present invention to provide a method and system for billing long distance telephone calls that may be used by external systems.

It is a further object of the present invention to provide a method and system for billing long distance telephone calls that includes fraud safeguards.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

Reference will now be made in detail to a preferred embodiment of the invention, examples of which are illustrated in the accompanying drawings. Wherever possible, the same reference numbers will be used throughout the drawings to refer to the same or like parts.

The present invention is directed to a method and system for facilitating the billing of long distance telephone calls. In particular, the service allows a subscriber to make long distance telephone calls from a location other than the subscriber's home without the use of a calling card. Instead, the calls will be billed as if made from the subscriber's home. As used herein, the phrase "automatic long distance billing service" or "ALDB service" refers, generally, to such billing services.

Figure 1:
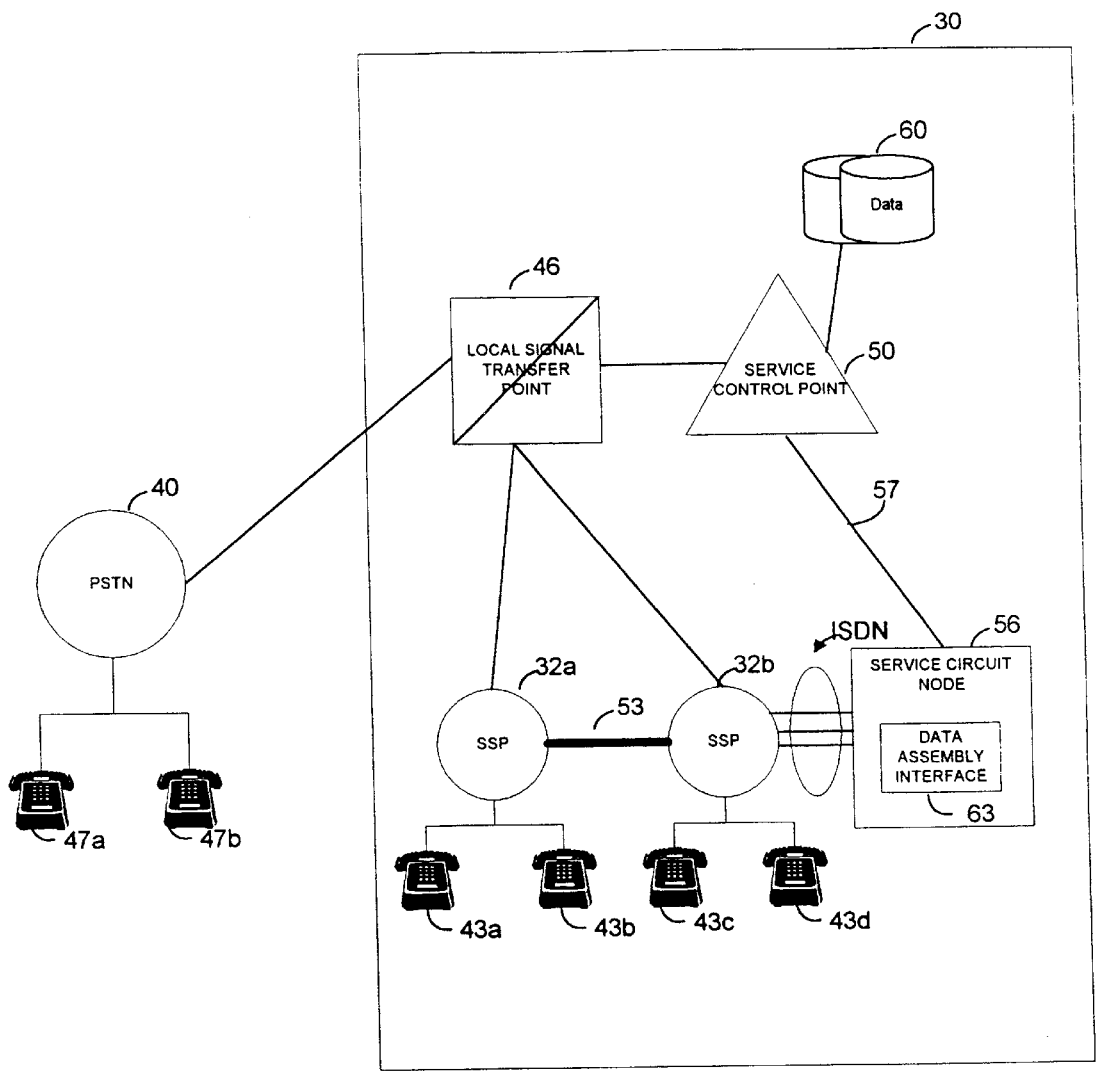
FIG. 1 is a block diagram of an exemplary telecommunications network, according to a preferred embodiment of the present invention.

FIG. 1 is a block diagram of an exemplary telecommunications network 30, according to a preferred embodiment of the present invention. The network 30 is coupled to a public switched telephone network 40. The PSTN 40 is coupled to a plurality of telephones, including telephones 47a, 47b. The PSTN 40 includes several Advanced Intelligent Network ("AIN") elements. For brevity, only a basic explanation of AIN is provided herein. Where the network 30 operates or is composed differently in an important aspect from that which would be understood by those skilled in the art, additional details are provided herein. For further information regarding AIN technology and aspects thereof, the interested reader is referred to U.S. Pat. No. 5,430,719, to Weisser, which is incorporated herein by reference.

The network 30 includes a variety of interconnected network elements. A group of such network elements includes the plurality of end offices which are indicated as service switching points ("SSPs" or "switches") 32a, 32b in FIG. 1. An SSP typically includes switch functionality, but also includes other functionality so as to communicate with other AIN elements as those skilled in the art understand. As further illustrated in FIG. 1 the SSPs 32a, 32b are coupled to a plurality of subscriber lines. A subscriber line may also be referred to as a calling line. Each SSP 32a, 32b serves a designated group of calling lines, and thus, the SSP that serves a particular calling line may be referred to as its serving switch. Each calling line is connected typically to a piece of terminating equipment including a plurality of telephones 43a–43d. Although telephones are illustrated as the terminating equipment in FIG. 1, those skilled in the art will understand that such terminating equipment may include other telecommunication devices including, but not limited to, facsimile machines, computers, modems, etc. End offices may further be coupled through a tandem office. The tandem office is used to connect and switch circuits between and among other end offices.

Each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

SSPs 32a, 32b are interconnected by a plurality of trunk circuits 53. These are the voice path trunks that interconnect the SSPs to connect communications. Each of the SSPs 32a, 32b is connected to another type of AIN element referred to as a local signal transfer point 46 via respective data links. Currently, these are data links employing a signaling protocol referred to as Signaling System #7 ("SS7), which is well known to those skilled in the art. Much of the intelligence of the AIN resides in yet another type of AIN element referred to as a local service control point ("SCP") 50 that is connected to STP 46 over an SS7 data link. Among the functions performed by the SCP 50 is the maintenance of network databases and subscriber databases as represented collectively by databases 60. These databases may be used in providing temporary advanced telecommunication services to a customer.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its databases or service package applications for processing instructions with respect to the particular call. The results are sent back to the SSP in response from the SCP 50 through STP 46. The return packet includes instructions to the SSP as to how to process the call. The instructions may be to take some special action as a result of a customized calling service or enhanced feature. In response, the SSP moves through its call states, collects the called digits, and generates further packets that are used to set up and route the call. Similar devices for routing calls among various local exchange carriers are provided by regional STP 46 and regional SCP 50.

As illustrated in FIG. 1, the network 30 also includes a service circuit node 56 ("SCN"). SCN 56 includes voice and dual tone multi-frequency ("DTMF") signal recognition devices and voice synthesis devices. In addition, SCN 56 may include a data assembly interface 58 for use in connection with the present invention. SCN 56 is connected to the local SCP 50 via data link 57 using an X.25 protocol. In addition, SCN 56 typically is connected to one or more SSPs via Integrated Service Digital Network ("ISDN") links.

In a preferred embodiment of the present invention, a subscriber may initiate a request for ALDB service by placing a call from a device associated with the calling line number to which the service is to be applied, usually, the subscribers home calling line number. In addition, the subscriber places the call to a special access code to indicate the request for the billing service. To accommodate these requests for advanced services, a preferred embodiment of the present invention provides for the recognition of a "trigger" at each of the SSPs that are used in connection with the exemplary embodiment. Each of the calling lines that may be used to request billing services at a particular SSP are provisioned with a termination attempt trigger ("TAT") in an idle state. When an advanced service, including ALDB service, is to be applied to a calling line, the SCP 56 provides the appropriate SSP with an instruction to change the state of the TAT trigger for that calling line from the idle state to an active state. The effect of a TAT trigger on a calling line in the active state will be understood to those skilled in the art as causing a pause at the SSP serving the calling line in the processing of any communication received on or directed to the calling line number. The SSP pauses so as to query the SCP and receive a response with instructions as to further processing of the communication. In this manner, the SSP obtains the instructions for applying the advanced service to the communication. When the service is to be removed from the calling line, then the SCP provides the appropriate SSP with an instruction to change the state of the TAT trigger for that calling line from the active state to the idle state. In the idle state, the TAT trigger does not cause a pause in the processing of a communication received on or directed to the calling line number.

Upon receiving a feature code (e.g., *77) from a subscriber, the SCP instructs the switch to route the call to an SCN for servicing. At the SCN, a transaction is opened and transmitted to the SCP for execution of a rental agreement between the subscriber and the service provider. The rental agreement specifies information about the service, the calling line, the originating point code, and other subscriber data. In addition, the SSP changes the status of the TAT trigger on the calling line associated with the communication from the idle state to the active state Details regarding the SCP feature code recognition, triggers, and the rental agreement are discussed in U.S. patent application Ser. No. 08/908,068, to Malik, filed Aug. 11, 1997, which is incorporated by reference herein.

Figure 2:
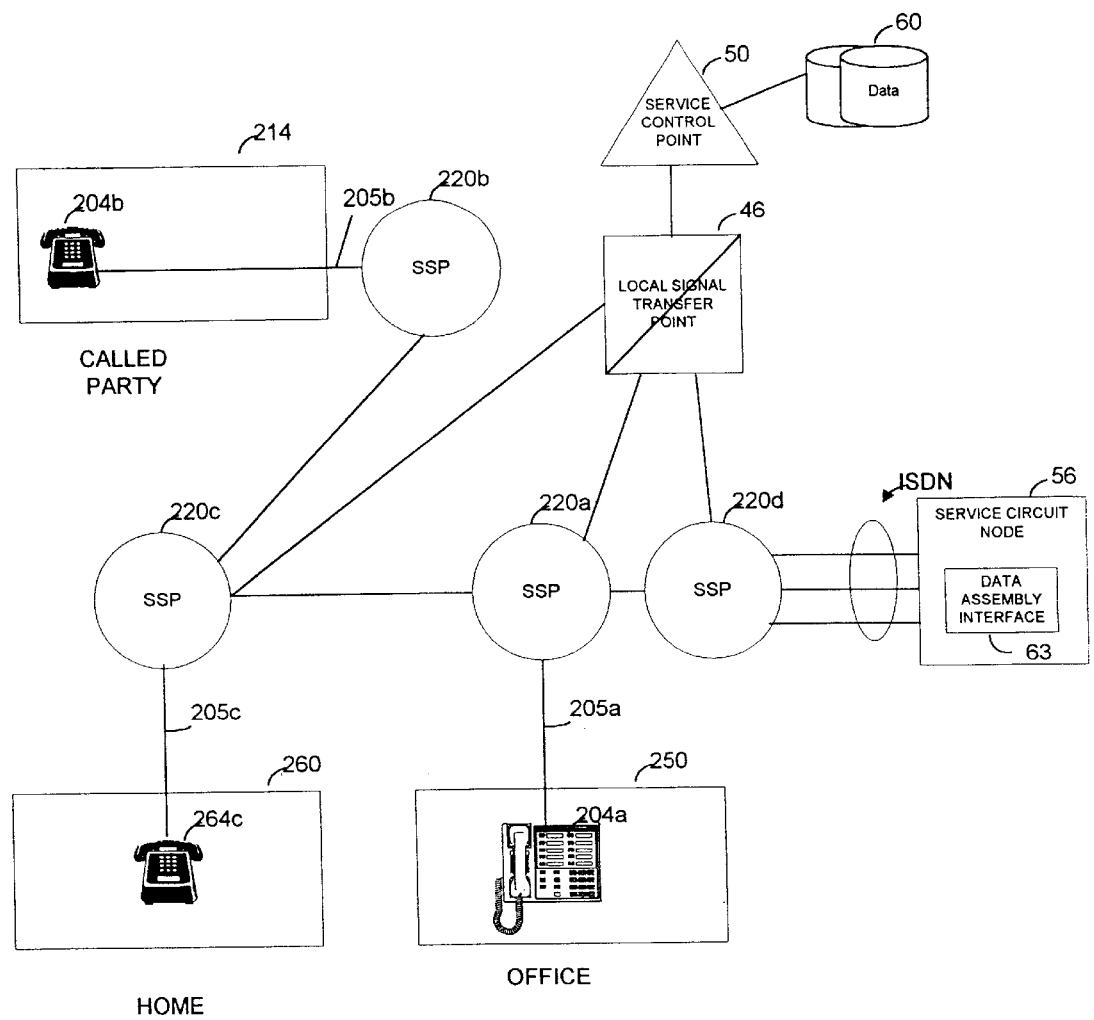
FIG. 2 is a block diagram of a network during a long distance telephone call from a remote location, according to a preferred embodiment of the present invention.

With continuing reference to FIG. 1 and now turning to FIG. 2, the exemplary operation of the present invention is described in the context of a calling party/subscriber placing a call to a called party using the ALDB service. The subscriber has previously activated the ALDB service from his home by dialing the feature access code, such that all ALDB calls will be billed to the subscriber's home. Thus, the dormant TAT trigger originally placed on the subscriber's switch has been activated. In this example, a calling party/subscriber uses his office telephone 204a, which is connected by calling line 205a (e.g., 770-555-2222) from his office 250 to SSP 220a. SSP 220c is provisioned with an active TAT trigger. The subscriber is placing a call to the called party located at a residence or business 214 having a calling line number (e.g. 312-555-7777) associated with telephone 204b. The called party's telephone 204b is connected by line 205b to SSP 220b. The subscriber desires that the call be billed to a calling line 205c from the subscriber's home 260. The home 260 may include one or more telephones, including telephone 264c.

Before placing the call to the called party, the subscriber first dials a special ALDB service access number. The call is directly routed to the SCN 56. The SCN 56 is programmed to make an inquiry of the desired communication. In particular, the SCN 56 requests the subscriber's destination telephone number, the subscriber's home number, (e.g. 770-555-4444), and other optional information. For example, the SCN 56 may be programmed to request a password created by the subscriber during activation of the ALDB service. The subscriber provides the requested information to the SCN using the touch tone keypad found on telephone 204a. The information is sent along to the SCN 56 in an ISDN User Part ("ISUP") message.

The SCN 56 in turn dials a feature access code as part of a Custom Dialing Plan ("CDP") and provides a string of digits containing call information that needs to be corrected. Specifically, the SCN 56 dials the feature access code associated with the CDP assigned to outbound lines on the SCN 56. The SSP 220d detects the feature access code based upon a CDP trigger. Consequently, the SSP 220d sends a Transaction Capabilities Application Part ("TCAP") message containing the feature access code and additional appended digits in the data string to the SCP 50.

The string of appended digits represents information about how the call is to be configured. The feature access code and string of data are provided by a data assembly interface 63. The data assembly interface 63 is a software program located within the SCN 56 and designed for assembling blocks of information or data. The data assembly interface 63 assembles the information obtained from the subscriber and the records of the subscriber in a special format for automatic transmission to the SCP 50. This data is then populated in the TCAP message.

Figure 3A:
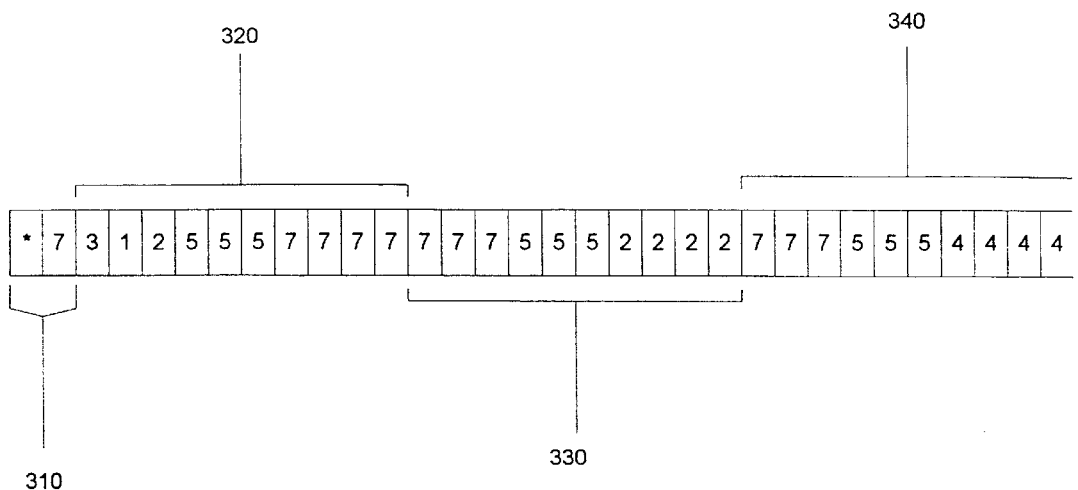
FIG. 3A is an exemplary ISUP message sent from a service circuit node to a service switching point, according to a preferred embodiment of the present invention.

FIG. 3A is a block diagram of an exemplary ISUP message string 300 transmitted by the SCN 56 to the SSP 220d. The ISUP message may include additional data as well. The message string 300 includes several fields. A Feature Access Code field 310 contains a two-digit feature access code (e.g., "*7"). The feature access code includes a CDP trigger, which is assigned to the outbound lines of the SCN 56, for involving an SCP in the call processing. A Redirecting Party Number field 320 contains the ultimate destination number provided by the subscriber when she originally dialed the ALDB number. The Calling Party Number field 330 contains the calling party number of the calling line 205a that originated the ALDB call. The Subscriber Number field 340 contains the subscriber's home telephone number. The SCN 56 assembles each of these fields into the single string 300.

As discussed above, the feature access code and string are sent along with the communication in the switch SSP 220d. The feature access code is recognized by SSP 220d as an indicator of the special status of the communication. More particularly, the feature access code typically triggers the switch to pause in the processing of the call and to obtain further instructions from other network elements, such as the SCP 50. The SCN's call to the feature access code is received in SSP 220d, which pauses in the processing of the communication to request instructions from the SCP 50. As part of the SSP's query to the SCP 50 for processing instructions, the SSP 220d provides the SCP 50 with information relating to the communication. In particular, the SSP 32a provides the SCP 50 with communication information including the feature access code and the string.

Figure 3B:
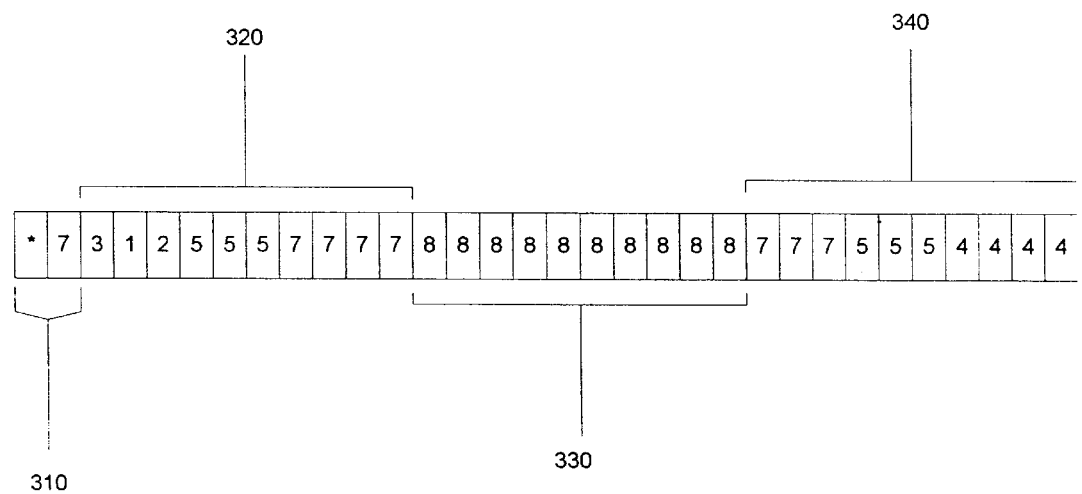
FIG. 3B is an exemplary TCAP message sent from a service control point to a service switching point, according to a preferred embodiment of the present invention.

In response to receiving the communication information and the identification information from the SSP 32a, the SCP 50 carries out certain functions. In particular, the SCP 50 recognizes the feature access code as indicative that the communication contains a string of data that the SCP 50 must process. The SCP 50 is responsible for reformatting the call data so that the billing information is ascribed to the calling party's home number. The SCP 50 checks its database 50 for information on how to handle the string of data. More particularly, as instructed by the feature access code, the SCP accesses a table in the database. The table provides instructions to the SCP 50 as to how to handle the data, and based on the information obtained, the SCP 50 reassembles this string of data. The SCP 50 then instructs the SSP 220d, in a response message, to route the call with the following instructions: (1) The calling party parameter is set to a special ALDB code; (2) The called party parameter is set to the home number of the subscriber; and (3) The redirecting party parameter is set to the destination number. The ALDB code instructs the SCP (during a return route) to treat the call in a different manner than other calls. FIG. 3B is a block diagram of a portion of an exemplary TCAP message transmitted by the SCP 50 back to the SSP 220d. The TCAP message may include additional data as well. As shown, the calling party number field 330 contains the special ALDB code (e.g., "8888888888"). The redirecting party parameter contains the destination number. The called party parameter contains the subscriber's home number.

Based on the instructions provided by the SCP 50 in the return TCAP message, the call is routed to SSP 220c with the fields populated as indicated. Once the call is routed to SSP 220c, the original TAT trigger provisioned on SSP 220c by the subscriber is encountered. Due to the TAT trigger, the switch pauses in the processing of the call and obtains further instructions from other network elements. Specifically, the SSP 220c pauses in the processing of the communication to request instructions from SCP 50. The SSP 220c provides the SCP 50 with information relating to the communication as a part of the SSP's query to the SCP 50, as well as routing information. The SCP 50 evaluates the call data and denotes that the calling party number field 330 of the TCAP message is the ALDB code and that the data must be manipulated to route the call. The SCP 50 examines the redirecting party to determine where the call should be routed. The SCP 50 then provides instructions to the SSP 220c to route the call. The calling party parameter is set to the subscriber's home number; and the Route Call To number is set to the redirecting party number received (i.e., the destination number).

When the SSP 220c receives these parameters, billing for the call is automatically charged to the subscriber's home number. The call is routed from the SSP 220c to an SSP 220b based on the called party number in the conventional manner.

Figure 4A:
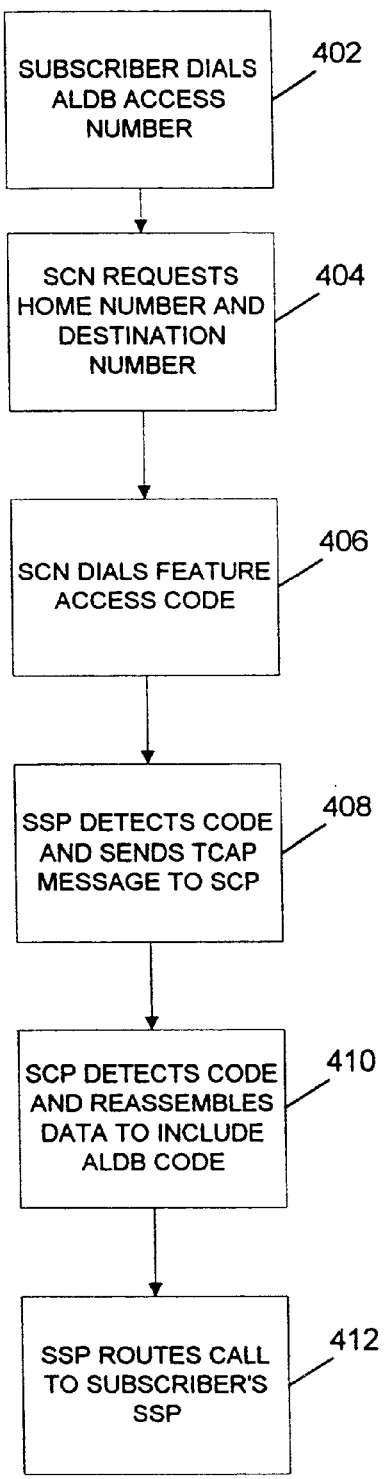
FIGS. 4A and 4B are flow charts illustrating processing that occurs during a long distance telephone call from a remote location.
Figure 4B:
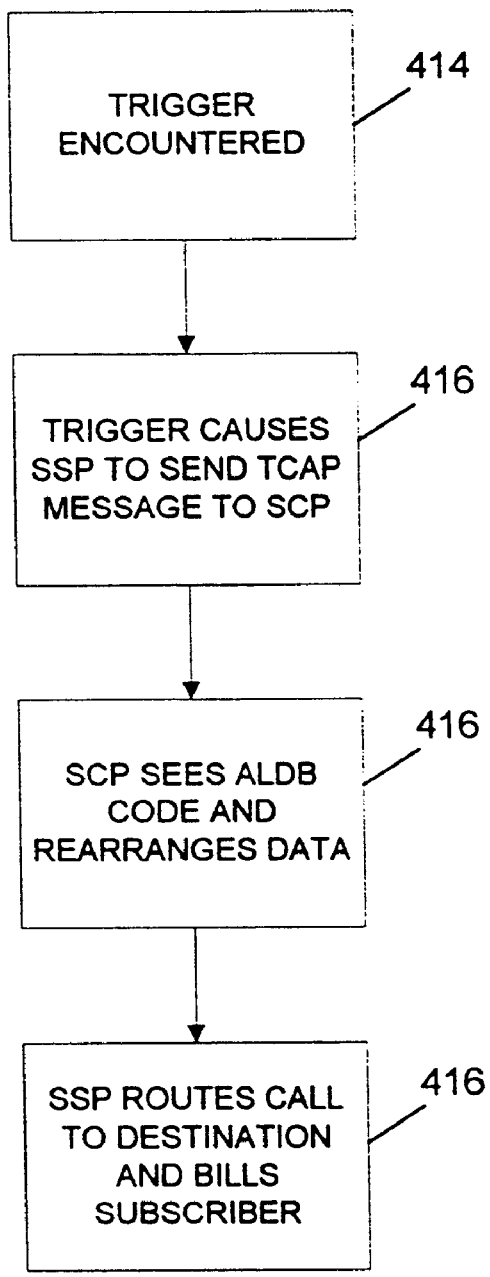

FIGS. 4A and 4B are flow charts illustrating an example of a subscriber making an ALDB call to a third party from his office. These figures assume that the caller has already established service with the local exchange carrier and that a record has been created for the subscriber. This discussion further assumes that a dormant TAT line placed on the SSP serving the subscriber's home has been activated by the LEC. In step 402, the caller dials the ALDB number. This call is actually a call to the LEC's SCN. The SCN is programmed, in step 404, to request the user's home telephone number and the number of the party that he's calling. In addition, the SCN may request an optional password. The user enters the home telephone number (e.g., 770-555-4444) and the called party's number. In step 406, the SCN dials a feature access code (e.g., "*7") to alert the SSP that the string should be sent to the SCP.

The feature access code ("*7") is detected by the SSP. Thus, in step 408, the SSP forwards the call and associated string in a TCAP message to the SCP for call processing. In step 410, the SCP recognizes the feature access code in the calling party field and reassembles the string of data by inserting an ALDB code as the calling party field, setting the called party parameter equal to the subscriber's home number, and setting the redirecting party parameter equal to the destination number. In step 412, the call is routed to the SSP serving the customer's home line. As stated above, this SSP is provisioned with a TAT trigger. When the TAT trigger is encountered, in step 414, the SSP receives the call data as described above. The TAT trigger causes the SSP, in step 416, to send a TCAP message to the SCP for further processing. The SCP recognizes the ALDB code and reassembles the data, such that the calling party parameter is set to the subscriber's home number and the called party parameter is set to the redirecting number (i.e., the destination number). In step 418, the SSP routes the call to the destination number and the subscriber's home number is billed.

In another embodiment of the present invention, a more automated method for providing ALDB service allows subscribers to select a list of phone numbers from which ALDB service is available. More particularly, during service establishment, the subscriber provides the ALDB carrier with a list of calling line numbers. These calling line numbers correspond to locations from which the subscriber may make a long distance call with billing to his home. For instance, a subscriber may select his office phone and a cellular/PCS telephone. These calling line numbers are stored in SCP databases.

Figure 5:
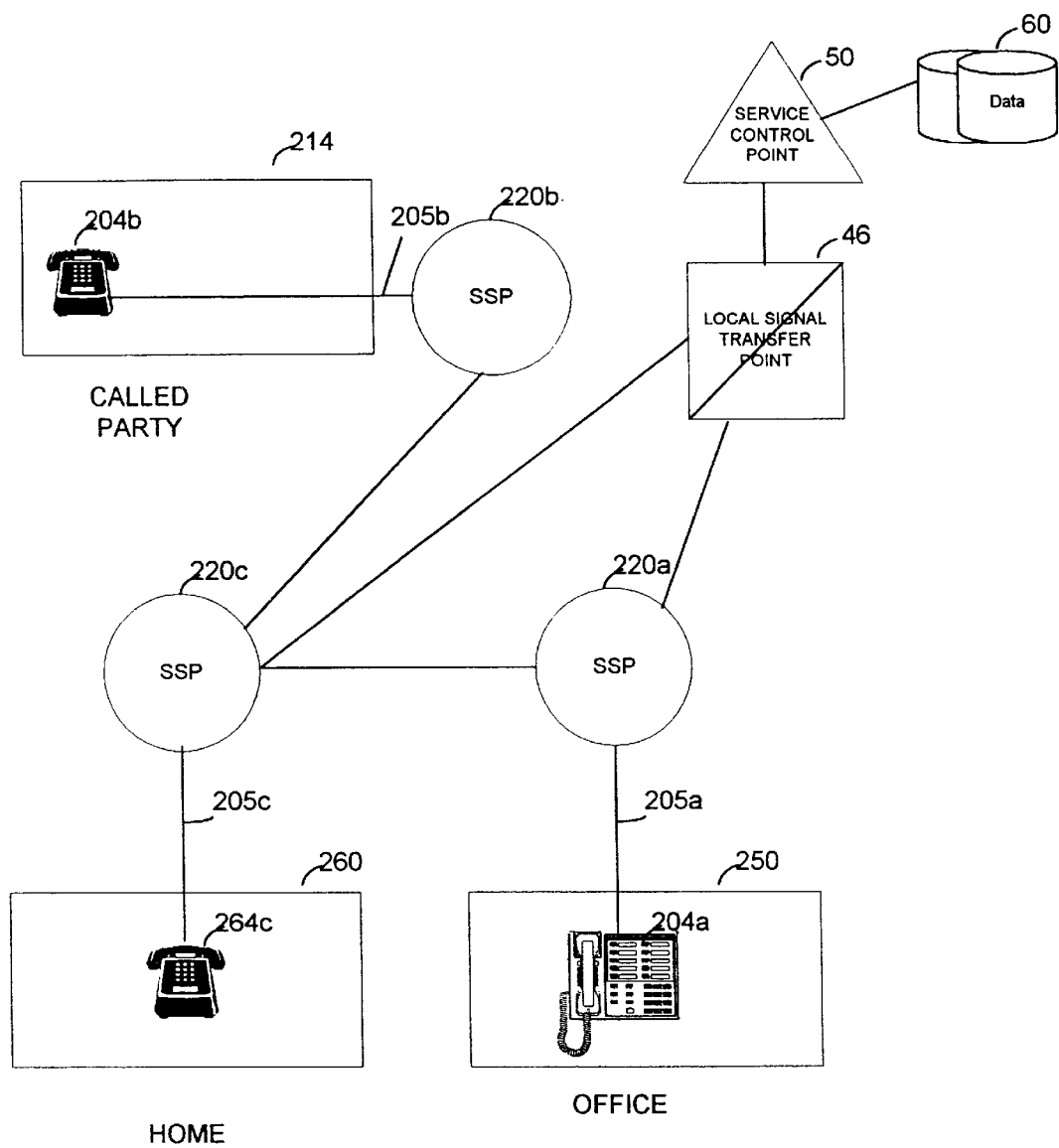
FIG. 5 is a block diagram of a telecommunications network, according to another embodiment of the present invention.

FIG. 5 is a block diagram of a telephone network 20, according to the second embodiment of the present invention. Rather than dialing the SCN, the caller dials his home number directly. The TAT trigger provisioned on the switch 220c for the home line causes the switch to pause during processing and request further instructions from the SCP 50. The SCP 50 searches its associated databases 60 to determine whether the calling party number is an authorized number. If the calling party number is authorized, the SCP 50 instructs the switch 220c to play a recorded announcement requesting the destination number. The subscriber provides the destination number to the switch which, in turn, transmits this information to the SCP. If the calling party number is not authorized, the SCP 50 instructs the switch 220c to connect the call directly to the home line.

In addition to selected calling line numbers, the subscriber may select a group of destination numbers corresponding to frequently-dialed long distance telephone numbers. The subscriber selects these numbers during service initiation. For example, a subscriber may select destination telephone numbers of his mother, his sister, and his brother. These numbers are stored in the SCP databases as a destination list. To create a particular destination number from a destination list, the subscriber dials a feature code (e.g. *55) from his home. The feature code causes the SCN to prompt the subscriber for a destination number from the list. The SCN may ask the subscriber to dial a single digit number. that corresponds to a particular destination number. Once the subscriber has selected the destination number, the SCP database uses a pointer or similar method to point to a particular destination number within the destination list of the caller. When the caller dials his home number from an authorized calling line number, the call is stopped by the switch. The switch queries the SCP for further instructions and provides the calling line number. The SCP checks the database for. the calling line number. The calling line number will correspond to an authorization/destination list. The SCP will instruct the switch to route the call to the destination number pointed to in the caller's destination list.

Multiple authorization lists and destination lists may be created for a single household. Thus, for instance, a husband and wife may create separate authorization/destination lists. The lists are separated by passwords for each individual. Both individuals establish separate lists at service initiation. Specifically, at service initiation, the SCP stores authorization and destination tables in its associated databases. When one of the individuals dials a feature code, the SCN prompts the subscriber for a password and a destination number from the list. The SCN may ask the subscriber to dial a single digit number that corresponds to a particular destination number. Once the subscriber has selected the destination number, the SCP database uses a pointer or similar method to point to a particular destination number within the destination list of the caller. Next, when that caller (i.e., the caller having access privileges to that authorization/destination list) dials her home number from an authorized calling line number, the calling line number will be used by the SCP to determine the proper authorization list/destination list. The destination number selected by the user will be retrieved by the SCP. The SCP will provide that number to the switch and the call will be connected. When another user calls home, a different authorization/destination list will be retrieved. Accordingly, another destination number will be selected from the list.

While the use of multiple authorization lists and destination lists limit the number of origination and destination telephone numbers, unauthorized or fraudulent use of this service may still occur. For instance, a subscriber may establish an authorization list for himself. The subscribers child may later make a call to the home from an authorized calling line number. Similarly, a subscriber may have a roommate with access to the authorized calling line. The roommate could then dial the home number to dial other long distance numbers.

Figure 6:
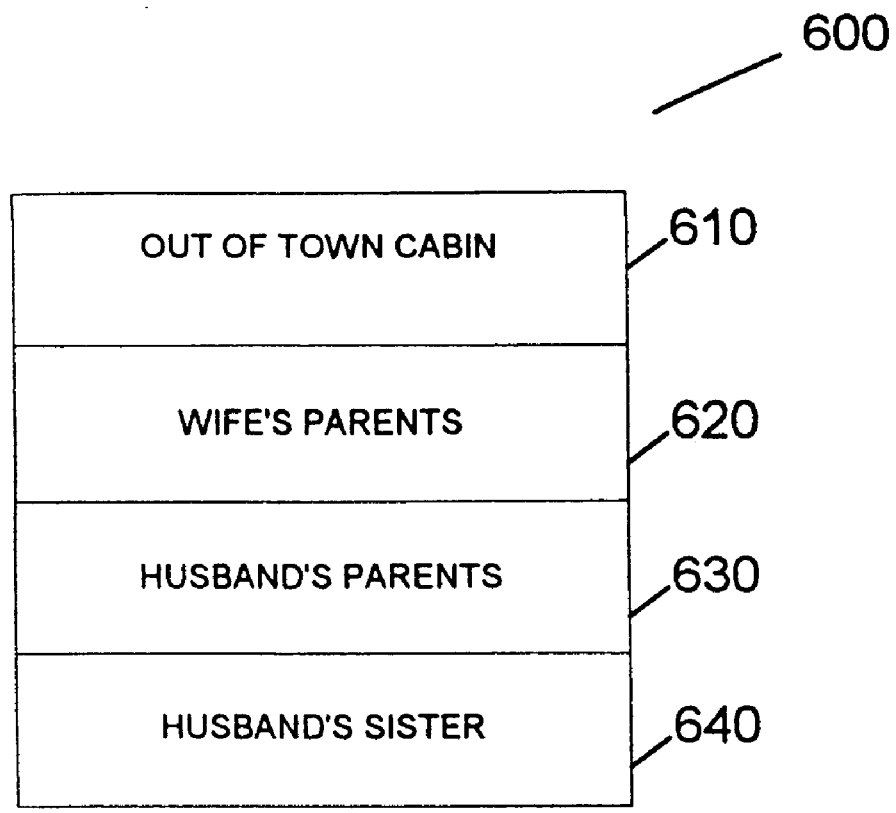
FIG. 6 is a block diagram of an exclusive list of destination numbers, according to the present invention.

To prevent fraudulent use, the present inventions may allow subscribers to establish an "exclusive list," 600 as shown in FIG. 6. The exclusive list 600 contains a group of exclusive telephone numbers that may be accessed using the method and systems described above. Unlike the destination list, the exclusive list is not linked to a particular authorization list. Instead, the exclusive list 600 contains a list of the only phone numbers that may be accessed by the service. For example, a family may set up an exclusive list 700 as shown in FIG. 6. The list 700 includes the telephone number of the family's out-of-town vacation cabin in field 610. If the parents decide to visit the cabin, the parent's teenage children could remotely call the parents by dialing the special ALDB number, as described above. Alternatively, the children could simply dial their home telephone number and get automatically routed to the cabin telephone number, as described above. The children could not, however, use the service to call friends in another long-distance location. Additional safety could be provided through the use of a password. Thus, for instance, the parents may provide their children with a password to be entered when dialing the service. The password may be changed by the subscriber at any time. To provide further protection, modifications to the password and exclusion list may be limited depending upon the subscriber's location. For example, the service may require that the subscriber perform such modifications only from her home.

The present invention may also allow automated services and systems such as voicemail and personal computers, to bill long distance calls to a third party number. During set up, the subscriber provides the calling line numbers for lines to which such systems and/or components (e.g., a modem) are attached. The SCP of the present invention stores the telephone numbers and a corresponding password provided by the subscriber when the system dials the ALDB service number or the home number, as described above, the ALDB service prompts the system for the password and the destination telephone number. The ALDB service receives the digits and proceeds to bill the call to the home phone. To prevent the system from accessing the service, the subscriber may change the password with the ALDB service.

Additional controls may be placed on the ALDB service to limit the date when calls may be made, the time of day of calls may be made, and the number of calls that may be made within specified time periods. A date limitation would allow ALDB calls to be made on certain days only. For instance, a subscriber may realize that she will be working an inordinate number of hours from her office over a three-day period. The subscriber would specify three dates for using the ALDB service. Each time, the caller dials the ALDB service number or her home number, the SCP checks the date of the call with the date stored in memory. If the parameters match, the call will be connected. Alternatively, the switch may use an internal timer that begins running at midnight (or another specified time) of the first date specified by the subscriber. While the timer is active, ALDB calls may be made. Once the timer has expired, no more ALDB calls will be allowed.

Similarly, specific time periods for using the service may be requested by the subscriber. For example, a subscriber's going out of town may leave his child with a friend. While he is out of town, however, he would like for his child to be able to reach him (without the friend being billed). Accordingly, the subscriber may dial a special number that will prompt him for the applicable time period for this use. In addition, the subscriber may select a password for the child to use during-this limited period. The SCP stores the time period and the password. When the subscriber's child calls into the system, the system prompts the child for the password and destination number. The system then checks the current time with the authorized time periods specified by the subscriber. If the call is made within the specified time, it is allowed to pass through. Otherwise, the caller is informed that the call is unauthorized and the call is disconnected.

The number of ALDB calls may also be limited. The SCP may include logic for tracking the number of calls made by a particular subscriber. The subscriber specifies the desired number of calls and the SCP stores this number. As calls are made, the SCP subtracts from the total number until the total is equal to zero. When the total is equal to zero, calls are not permitted to pass through the system. The subscriber may then call a special number to order additional calls.

As an alternative to the methods described above, the service provider may provide separate access to a particular switch within the network. The switch is provisioned with an active TAT trigger by the local service provider. When a subscriber calls the switch, the TAT trigger causes the switch to send a query to the SCP for additional information. The switch provides the SCP with the calling line number. The SCP instructs the switch to play a message requesting the caller's home number and a password.

Having thus described a preferred embodiment of a method and system for automatically billing long-distance telephone calls as if they were made from a home number, it should be apparent to those skilled in the art that certain advantages have been achieved. It should also be appreciated that various modifications, adaptations, and alternative embodiments thereof, may be made within the scope and spirit of the present invention. The invention is further defined by the following claims:

What is claimed is:

1. A method for billing for a communication between a selected number and a destination number as if the communication were made from a predetermined calling line number, the method comprising
    storing at least an authorized number;
    receiving information related to a communication from a selected number and directed to a predetermined calling line number, the information including the selected number and the predetermined calling line number;
    comparing the selected number to the authorized number;
    if the selected number compares to the authorized number, then obtaining a destination number for the communication, and routing the communication to the destination number; and
    billing the communication to the predetermined calling line number.

2. The method for billing for a communication, as recited in claim 1, further comprising:
    storing at least an authorized destination number;
    comparing the destination number to the authorized destination number; and
    routing the communication to the destination number if the destination number compares to the authorized destination number.

3. The method for billing for a communication, as recited in claim 2, further comprising:
    storing the authorized destination number in an exclusive list of destination numbers; and
    receiving a password before altering the exclusive list of destination numbers.

4. The method for billing for a communication, as recited in claim 2, further comprising:
    storing one or more authorized dates for communications from the selected number;
    determining a date of the communication;
    comparing the date of the communication to the one or more authorized dates; and
    routing the communication to the destination number if the date of the communication matches the one or more authorized dates for communications from the selected number.

5. The method for billing for a communication, as recited in claim 2, further comprising:
    storing one or more authorized time periods for communications from the selected number;
    determining a time of the communication;
    comparing the time of the communication to the one or more authorized time periods; and
    routing the communication to the destination number if the time of the communication falls within the one or more authorized time periods for communications from the selected number.

6. The method for billing for a communication, as recited in claim 2, further comprising
    storing a number of communications allowed to be billed to the predetermined calling line number;
    keeping a current count of the number of communications corresponding to the predetermined calling line number;
    comparing the current count of communications to the number of communications allowed to be billed to the predetermined calling line number; and routing the communication to the destination number if the current count is less than or equal to the number of allowable communications.

7. A method for charging a call, comprising:

receiving a call originating from a selected number and directed to a preselected number;

finding the selected number to be associated with the preselected number;

obtaining a destination number from the call;

routing the call to the destination number; and billing cost of the call to an account of the preselected number.

8. The method of claim 7 wherein receiving the call comprises receiving the call at a switch serving the preselected number.

9. The method of claim 7 wherein finding the selected number to be associated with the preselected number comprises finding the selected number to be associated with at least an authorized number associated with the preselected number.

10. The method of claim 7 further comprising:

storing the authorized number in association with the preselected number.

11. The method of claim 7, further comprising:

after obtaining the destination number from the call, checking if the destination number is an authorized destination number; and if the destination number is the authorized destination number, then routing the call to the destination number.

12. The method of claim 11, further comprising:

storing the authorized destination number in associated with the preselected number.

13. A method for billing cost of a call, comprising:

routing a call received from an originating number to a switch serving the dialed number;

without terminating the call to the dialed number, causing the switch to check if the call is to be accorded a billing service;

if the call is to be accorded the billing service, then obtaining a terminating number for further routing of the call, then further routing the call to the terminating number, and billing cost of the call to the dialed number.

14. The method of claim 13, wherein the causing the switch to check if the call is to be accorded the billing service comprises checking if the dialed number is associated with the originating number; and if the dialed number is associated with the originating number, then determining the call is to be accorded the billing service.

* * * * *